United States Patent [19]

Luthra et al.

[11] Patent Number: 4,553,437

[45] Date of Patent: Nov. 19, 1985

[54] HYBRID NON-INVASIVE ULTRASONIC IMAGING SYSTEM

[75] Inventors: Ajay K. Luthra; Saleem Kassam, both of Bala Cynwyd; J. William Mauchly, Ambler, all of Pa.

[73] Assignee: Imaging Associates, Villanova, Pa.

[21] Appl. No.: 574,883

[22] Filed: Jan. 30, 1984

[51] Int. Cl.$^4$ .............................................. G01N 29/04
[52] U.S. Cl. ........................................ 73/602; 73/626
[58] Field of Search ................. 73/602, 626, 620, 625; 128/660; 364/414

[56] References Cited

U.S. PATENT DOCUMENTS

| 3,931,597 | 1/1976 | Cho et al. | 333/154 |
| 4,105,018 | 8/1978 | Greenleaf et al. | 73/602 |
| 4,206,653 | 6/1980 | Lemay | 73/602 |
| 4,265,126 | 5/1981 | Papadofrangakis et al. | 73/602 |

*Primary Examiner*—Anthony V. Ciarlante
*Attorney, Agent, or Firm*—Ratner & Prestia

[57] ABSTRACT

Certain ones of a total array of ultrasonic transducers constitute a small aperture and are so energized as to project acoustic energy onto predetermined parts of a scene. Reflections of the transmitted signals are received by certain ones of the array, are converted to electrical signals and are appropriately delayed to enable additive combination of the amplitude of the received signals emanating from the same points in the scene ("targets"). The phase (or time delay) as well as the amplitude information of the reflective signals are stored. Next, the same transmitting elements ("subarray") project acoustic energy upon the remaining parts of the scene in sequence and the reflected signals are similarly processed and stored. This continues until all the parts of the predetermined scene have been interrogated by insonification from that subarray and the reflected signals have been similarly processed. Then, at least one more set of transducers of the total array, which also constitute a small aperture, are caused to scan the same parts of the image in the same sequence thereby producing the same types of reflected signals which are processed similarly, and whose amplitude and phase information is similarly stored. The plurality of the stored signals from each subarray, which may be termed "complex image" signals, are then vectorially added and further processed to derive a video signal which is used to produce a final display image.

14 Claims, 1 Drawing Figure

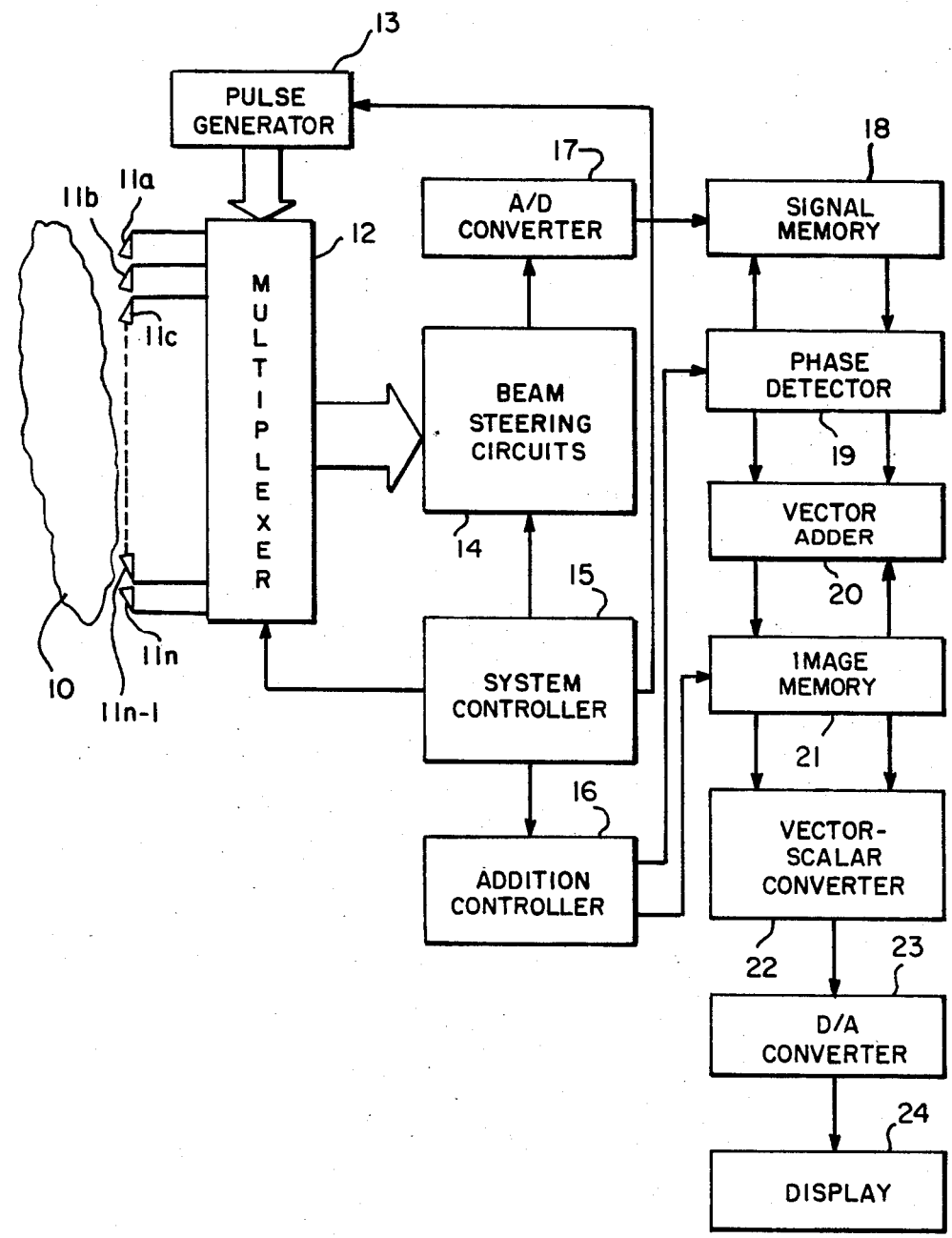

HYBRID NON-INVASIVE ULTRASONIC IMAGING SYSTEM

BACKGROUND OF THE INVENTION

1. Field of the Invention

This invention relates to non-invasive, ultrasonic imaging systems, especially high resolution, well-focused systems for obtaining images of internal organs of human or animal bodies.

2. Prior Art

In the field of ultrasonic imaging, there are a number of desiderata, such as: high resolution, proper focus, short data-gathering time, low susceptibility to motion of the body being examined, good signal-to-noise ratio, and simplicity and inexpensiveness of the associated electronics.

Conventional ultrasonic imaging systems included those in which the entire aperture is used simultaneously to form the energy-transmitting beam and to receive returning echo signals. If a phased array is employed in producing the beam, electronic circuits such as delay circuits are required for each element of the array. Moreover, because the entire aperture is used, there will be a limited depth of field and steps must be taken to achieve dynamic focus during reception of the reflected signals. Nevertheless, since each pixel of the scene is interrogated by insonification only once in deriving the signals used in forming the image, this type of system is relatively immune to motion of the object during scanning.

Another approach, known as the "synthetic aperture" system employs only part of the available aperture at any given time. Therefore, no transmit beam is formed which needs to be focused and simpler electronic hardware can be used. One such system is disclosed in the co-pending application, Ser. No. 520,573 of Luthra, Kassam and Bernardi entitled "Body Imaging Using Signal Processing to Achieve Effect of Scanning Beam Continuously Focused in Range" filed Aug. 5, 1983. In that system, the acoustic energy is projected upon the entire scene from different transducers in sequence, the reflected signals are processed so that those emanating from the same targets will additively combine in amplitude. Phase or time delay information in the echo signals is preserved and the resulting complex signals are vectorially added to produce an image comparable to that produced by a scanning beam which is continuously focused on all points in the scene.

The present system achieves some of the advantages of conventional large aperture systems, as well as achieving effective dynamic focusing on transmission, but also reduces the susceptibility of the system to motion of the body and reduces the time required to gather the data. Despite these advantages, however, the present system is considerably simpler than many conventional systems.

Accordingly, it is among the objects of the present invention to provide an ultrasonic imaging system which:

1. Is less susceptible to the effects of motion than other synthetic aperture systems.
2. Does not require as long a time interval as other synthetic aperture systems to produce the data-representative signals required for display of an image.
3. Approximates the use of a larger effective transmitting aperture.
4. Enables the display of an image comparable to that resulting from employing a scanning beam of larger aperture which is continuously focused at all points on the scene, on transmission as well as reception.
5. Improves the signal-to-noise ratio in the displayed image.
6. Reduces and simplifies the required associated electronic hardware.
7. Attains still other objects which will appear to one upon reading the specifications and claims and perusing the drawing herein.

BRIEF SUMMARY OF THE INVENTION

Apparatus for projecting from a first small aperture acoustic energy signals upon selected parts of a scene, deriving from echoes of said energy signals a first complex image signal having amplitude and phase components corresponding to said parts, similarly projecting acoustic energy from at least a second small aperture onto the same parts of the scene to derive at least a second complex image signal, vectorially combining said complex image signals, and processing the combined signal.

BRIEF DESCRIPTION OF THE DRAWING

The sole drawings is a block and schematic representation of an overall system in accordance with one embodiment of the present invention.

DETAILED DESCRIPTION OF THE DRAWING

Referring to the sole FIGURE, there is shown schematically a body 10, whose internal constituents are to be non-invasively probed by ultrasonic energy to derive a displayable image. There is an array of ultrasonic transducing elements 11a, 11b, 11c–11n shown coupled to a multiplexer 12. There may be as many as, for example, 128 such transducing elements and the multiplexer may be of conventional design comprising a plurality of FET transistors or PIN diodes. In the example shown, the multiplexer may be so constructed as to provide 64 output channels that are coupled to the input of the beam steering circuits 14. The output channels may be so related to the input channels that each of the 64 output channels has a 1-of-3 selector. In this embodiment, the transducing elements are connected to the various output channels as follows:

a. The first, thirty-third and sixty-fifth transducing elements are coupled to the first output channel.
b. The second, thirty-fourth and sixty-sixth transducing elements are coupled to the second output channel.
c. The sixty-fourth, ninetieth and one hundred twenty-eighth transducing elements are coupled to output channel 64.

In order to arrive at 64 output channels, they are arranged in overlapping fashion, e.g., the top 64, the bottom 64, and the central 64 for receiving the echo signals. For the reasons best explained through mathematical analysis, it is highly desirable to have overlap of the field of view of each aperture or subarray. However, unless the size of the aperture is doubled, the benefits of overlap are really not obtained. If one doubles the size of the aperture by providing two subarrays and if the benefits of overlapping are to be obtained, there must be at least three subarrays. While two subarrays operate to produce an image, such an image is not as satisfactory as those produced by three overlapping subarrays. If the number of elements in each subarray is very large, however, the need for overlap is considerably reduced, if not eliminated. The circuits are so arranged that anyone of the three groups of contiguous elements (subarrays) may be selected. Each subarray effectively constitutes a small apeerture relative to the total aperture of 128 elements.

While it is generally true that the larger the aperture, the greater the resolution, there are practical limitations as to how many elements are actually used at any given commercial system. One practical consideration is how costly it will be to fabricate an array of a larger number of elements. There is a corresponding question as to how costly it will be to provide the electronic circuits required for each of the elements of the array. There are also two other theoretical limitations. One is that if the number of elements grows too large, it is difficult to maintain coherence of the rays of the beam as it travels through the body. Because of irregularities or disturbances in the propagation characteristics of the body, there may not be the required correlation between the left side and the right side of the array in terms of the phase information. The other consideration is that increasing the number of elements increases the time required to acquire the data for processing. If the time interval is too long, it is not really a real-time system and is not commercially viable. Furthermore, the image becomes more and more susceptible to motion in various parts of the body.

On transmission, selected ones of elements 11a, 11b, etc. are actuated by a pulse generator 13 coupled by 32 channels to the central 32 elements of each of the subarrays. Thus, the first transmission aperture consists of transducers 17 thru 48; the second transmission aperture of elements 49 thru 80; and the third aperture of elements 81–112. Only 32 are used on transmit to obtain better focus characteristics than are achievable by using more of them. This allows the pulses in the various ones of the 32 channels to be time delayed and the multiplexer 12 can select any one of the three energized subarrays, i.e., the sets of 32 contiguous elements.

As previously stated, the transmitted beam from each subarray can be steered in any direction to cause interrogation of any selected part of the scene. While some types of ultrasonic devices produce beams which are manually shifted across the body and others such as linear scanners, have a large number of transducing elements located in a row which can be successively energized by pulses, most scanners involving arrays do require beam steering. In such conventional systems, the beam formed by the emissions of a plurality of transducing elements, is moved in azimuthal fashion across a pie-shaped field of view of the scene to be insonified. In the present system, the scansion may be done as follows. Assuming a field of view to embrace a 90° field of view, the first subarray scans in successive intervals of time with a beam at say, −45°, −44°, etc. to +45° whereupon the next subarray duplicates the scanning sequence starting with −45°.

Alternatively, the first subarray could produce a beam at −45°, the subarray 2 could do the same thing followed by subarray 3. Next, subarray 1 would produce a beam at −44° and subarrays 2 and 3 would do the same thing in sequence, and so on. The latter system is preferable in that it minimizes the effects of motion in the body.

The beam steering circuits 14 comprise one channel of amplification for each of the channels of multiplexer 12. In addition, those amplifiers are followed by variable time delay circuits which may be of conventional design comprising lumped constants or charge coupled devices. They are used for delaying the analog signals received from the amplifiers and preferably (for this embodiment) should have a delay capability of up to 13 microseconds. If desired, a commercially available phased array, such as the Hewlett-Packard Model 77020A, having a 64 channel capacity and known as "Ultrasonic Imaging System" may alternatively be adapted for this purpose. The steering circuits 14 also include summation circuits whose composite output signal is used in producing the "focused" ultrasonic beam of a particular subarray in a particular direction. The direction of the beam can be changed between successive pulses in response to control signals applied to circuit 14 from the system controller 15.

One of the functions of the system controller 15 is to select, by the application of appropriate control signals to the multiplexer 12, the direction of the transmitted beam and which of the 3 subarrays is to be actuated. This controller can be, for example, a computer such as the DEC LSI 11/23. This particular computer is based upon a microprocessor and instructions for it can be either in assembly language or a language such as FORTRAN. A copy of a suitable program is appended to this application. It is in source code.

When the system is operating in the receiving mode the output signals of circuit 14 are fed to an analog-digital converter 17 which converts them to a digital form suitable for storage in the signal memory 18. The latter can be a RAM having a two megabyte capacity, such as the Dataram DR 329 Wide Word Bulk Semi-Memory System. Instead of using a single analog-digital converter 17 after the beam steering circuits 14, the converter acting upon a summed analog signal, there could be an analog-digital converter provided for each of the signals in the 64-channel bus coupling multiplexer 12 to beam steering circuits 14. In that case, the digital converters will provide digital signal inputs to circuits 14 so that the introduction of delay into those digital signals could be accomplished by digital means.

When the digitized signals are placed into that memory they are fixed in time-related memory storage locations. That is to say, each storage location in it corresponds to a known time interval after the pulse was transmitted onto the selected part of the body. Since the speed of sound in the body is fairly constant, it can be said that each storage location corresponds to a known distance into the body.

Phase detector 19 is provided for deriving from the stored signals in signal memory 18 a vector quantity representing the phase and amplitude of the signal at a specified distance from the transmitting transducers. Whenever a selected distance is specified to it upon receipt of a range signal from addition controller, 16 it produces two digital numbers on two respective output lines which correspond to the in-phase and quadrature components of the signal at that range or distance. The phase detector can operate, for example, according to either one of two different principles, i.e. (1) select two samples from signal memory 18 which were taken at times which were T/4 apart, where T is the period of the center frequency of the signal, or (2) multiply by the sine and cosine of the center frequency over a window of several samples of signals stored in signal memory 18 and then add the components of the resultant vectors. Regardless of which method is used, its output is a pair of numbers in digital form which represent the signal at a specified range. If the precision desired is greater than the sampling rate during digitization, a complex phase-shift operation may be performed to interpolate to the closest desired range. Otherwise, some of the complex digital numbers to be put into the time slots of memory 21 may have values that do not allow them to be put into available slots, but rather fall between two of those locations. It is to avoid this that the signal processing may include steps to modify these signals so that they will have a value such that they will fall into the slot for numbers closest to them in value.

Another possible modification of the system would be to locate the phase detector to receive the summed signal in the output of circuits 14. In that case, there would be two-analog digital converters to which I and Q signals would be respectively supplied.

Addition controller 16 may take the form of a large ROM having a list of all pixel addresses in image memory 21 which correspond to every possible beam angle produced by the subarrays. It is under the control of signals applied to it from system controller 15. Controller 16 determines by its address signals applied to image memory 21 which location in that memory 21 (correspond to a pixel) is accessed. To determine which pixel corresponds to a pulse of acoustic energy fired from a particular transducer subarray at a particular angle, the paths of all the pulses to be transmitted from a single subarray can be projected on to the X, Y grid of the image memory 21 and a fan-shaped pattern of rays emanates from the center of the transmitter. By so doing, it can be determined which ray is geometrically closest to the pixel location, that ray then being considered to correspond to the specified pixel.

The in phase (I) and quadrature (Q) signals from the phase detector are applied to the vector adder 20 where one vector from each subarray for one pixel at a time is to be added to the current contents of the image memory 21, the specific pixel selected being determined by address signals from the addition controller 16. Adder 20 operates in conventional sequence, i.e., (1) it acquires the current contents of a selected pixel-representative signal location in image memory 21, (2) obtains a new phase vector from the phase detector, (3) adds the I and Q components separately, and (4) applies the new vector sum back into the same pixel signal location in the image memory thereby replacing its old contents in that slot.

The addition controller can be implemented in ways other than storage of the range information corresponding to each pixel. Instead, based upon the x and y coordinates and the known position of the transmitter, the range of each pixel could be computed (rather than being stored) by the system controller (CPU). Also, the capacity of the ROM can be reduced by a factor of 6 by taking advantage of the symmetrical aspects of the scene, i.e. (1) since the geometry of the three subarrays are identical, the pixels corresponding to a particular beam differ only in a constant translation of the X component, and/or (2) the left-right mirror symmetry along the center of each subarray can also be exploited.

When the image memory 21 has all of its locations filled with the vectorial-representative digital information of the updated I and Q signals, they must then be converted to scalar quantities before changing them from digital form to analog form for display on a cathode ray tube which is an analog device.

Since the object of this apparatus and method is to produce a video-type display, which is of the analog signal type, the stored pixel-representative digital numbers in the image memory 21 which correspond to vector quantities must first be converted to scalar quantities and the latter must be converted from digital to analog signals. The converter 22 accepts the two numbers of each memory location in memory 21 which corresponds to each pixel and derives a single number in digital form which is applied to converter 23. The two numbers in each memory location in memory 21 can be representative of two different amplitudes at right angles to one another or can be amplitude and phase-representative numbers. If the two numbers represent two amplitudes at right angles, the converter 22 performs the mathematical operation of squaring each of them and then taking the square root of their sum. Apparatus is well known for doing this although this could alternatively be accomplished by using a computer and appropriate software.

The single scalar number at the output of converter 22 is applied to a conventional digital-analog converter to derive a video signal applied to a cathode ray tube for producing the image of the scene being probed.

Mathematically, the various steps of insonification by each of the plurality of subarrays and the reception and processing of the reflected signals can be regarded as follows: If there are M transmitting apertures (subarrays) used in sequence and M complex images respectively corresponding to these apertures (subarrays) to be obtained. Let $I_m$ by the mth complex image corresponding to the mth transmitter and $i_{mn}(p)$ and $i_n(p)$ be the complex numbers denoting the amplitude and phase of the nth frequency component in the composite time signal corresponding to the pth pixel, in the mth complex image and the final complex image, respectively. The value $i^n(p)$ is obtained by $$i_n(p) = \sum_{m=1}^{M} i_{mn}(p) \tag{A}$$

The signals corresponding to this equation A are found in signal memory 18.

The complex images obtained at different frequencies can be added together to give the displayable image. I(p) be the intensity of the pth pixel to be displayed. I(p) is obtained by $$I(p) = \sum_{n=1}^{N} a_n |i_n(p)|^2 \tag{B}$$

where N is the number of the frequency components which can vary from one to any arbitrary number depending upon the system constraints and $a_n$ is the weighting coefficient attached to the nth frequency component and can be varied to obtain different types of images.

The signals corresponding to equation B are present in image memory 21.

The designer of the system must initially determine how many complex number signals are required to adequately describe the original object when they are finally summed. If just one frequency component is used, there is no summation. However, if several frequency components are used, one of them is often weighted more than the others so that it can be a better match for the characteristics of the transmit pulse which has a finite time duration. It may be found preferable to weight the central frequency components more than the off-center frequency components. For purposes of reducing memory requirements, one frequency component may prove desirable.

In the accompanying program material, there are a number of programs and subroutines which will now be discussed.

RTHETA creates a set of data which can be used by the addition controller. This material is inserted in the ROM of the addition controller.

RAYMAP does precomputation for use in the beam steering circuits for specifying a certain angle at which the beam is to be steered; i.e., its output corresponds to precomputed delays to which the signals in the channels coupled to the elements of the subarray are subjected. Although the drawing shows the use of separate beam-steering circuits, their function can be done by the use of programmed computer operations in the CPU.

RAYADD is the program which controls the actual beam-steering processing in the computer after the data precomputed by the RAYMAP is available.

PIXSCN processes the signals from signal memory 18, and performs the phase detection. It effectively is the equivalent of the addition controller and the phase detector in the drawing. The phase detection is done in a subroutine in that program called DETECT. It also directs the correct placement of the complex number information into image memory 21 ((subroutine PUT-PIX).

SCREEN FILE means image memory 21.

The program NDATA can be used to perform the function of the vector adder 20 as well as the function of the vectorscalar converter 22.

These programs are especially designed to be used with the LSI-11/23 CPU with a peripheral attachment known as "Skymnk" array processor which performs certain scientific routines.

In one embodiment of the invention the digital-analog converter 23 and the display may be the AED512 graphics terminal.

Further comments and explanation of the program material appended hereto is found in the first two pages entitled "Hybrid Image Programs".

What is claimed is:

1. A method for producing signals for forming images of a predetermined scene within a body comprising:
   (a) projecting acoustic energy from a predetermined small aperture onto a plurality of parts of said scene in sequence,
   (b) receiving acoustic energy reflected from said respective parts in sequence and producing corresponding first electrical signals;
   (c) processing said first electrical signals to produce first image signals in which signals corresponding to echoes from the same targets are additively combined
   while the entire vectorial information represented by said signals is preserved,
   (d) projecting acoustic energy from at least one other small aperture onto said plurality of parts of said scene in sequence,
   (e) receiving acoustic energy reflected from said parts in response to step (d) and producing at least corresponding second electrical signals,
   (f) processing said second electrical signals to produce second image signals in which signals corresponding to echoes reflected from the same targets additively combine
   while the entire vectorial information represented by said second signals is preserved, and
   (g) combining all of said image signals vectorially thereby to produce an output signal which is to be supplied to a utilization circuit.

2. The method according to claim 1 wherein said first and second image signals are stored prior to said vectorial combination thereof.

3. The method according to claim 1 wherein said first and second small apertures comprise respective pluralities of electro-acoustic transducers.

4. The method according to claim 3 wherein said pluralities of transducers include selected ones of those transducers in common.

5. The method according to claim 1 wherein there are at least three of said apertures.

6. The method according to claim 1 wherein said utilization device is a video display device.

7. Apparatus for producing signals for forming images of a predetermined scene within a body comprising:
   (a) a plurality of sets of means for projecting acoustic energy onto said body,
   (b) means for causing a first of said sets to project acoustic energy onto selected parts of said body in sequence,
   (c) means for receiving acoustic energy signals reflected from said insonified parts and processing them so that echoes emanating from the same targets additively combine while preserving the entire vectorial information thereof, said processing thereby producing first electrical image signals,
   (d) means for storing said first image signals,
   (e) means for causing at least a second of said sets to project acoustic energy onto said selected parts in said sequence,
   (f) means for receiving acoustic energy signals reflected from said parts insonified by said second set and processing said reflected signals so that echoes emanating from the same targets additively combine while the entire vectorial information thereof is preserved, said processing thereby producing second electrical image signals,
   (g) means for storing all of said image signals with said vectorial information, and
   (h) means for vectorially combining all of said image signals.

8. The apparatus according to claim 7 wherein said plurality of sets of means for projecting acoustic energy comprise a plurality of subarrays of electro-acoustic transducers.

9. The apparatus according to claim 7 wherein said (b) means includes multiplexing means coupled to said plurality of sets of means for projecting acoustic energy, pulse generator means coupled to said multiplexer means, and controller means coupled to said multiplexer and to said pulse generator means.

10. The apparatus according to claim 9 with the addition of means coupled to said multiplexer and to said controller for controlling the direction of the acoustic energy projected onto said body of said sets of means.

11. The apparatus according to claim 8 wherein at least two of said plurality of sets have means in common for projecting acoustic energy.

12. The apparatus according to claim 8 wherein fewer of said electroacoustic transducers are used for projecting energy than are used for receiving acoustic energy reflected from parts of said scene which have been insonified.

13. Apparatus for producing signals which can be used to form images of a predetermined field of view within a body, comprising:
   (a) an array of electro-acoustic transducers adapted to be placed in sonic communication with said body,
   (b) means for causing selected ones of said transducers forming a subarray to project acoustic energy upon predetermined parts of said body in sequence,
   (c) means for causing selected ones of said array of transducers to receive echoes of said insonified parts,
   (d) means for processing said echoes and producing electrical signals in response thereto such that said electrical signals corresponding to echoes reflected from the same targets within said body additively combine while preserving the entire vectorial quantity represented by said combined signals,
   (e) means for causing selected others of said transducers forming a second subarray to project acoustic energy upon said body in sequence,
   (f) means for causing selected ones of said array to receive echoes produced by insonification by said second subarray,
   (g) means for processing said echoes and producing electrical signals corresponding thereto such that those electrical signals corresponding to echoes reflected from the same targets within said body additively combine while preserving the entire quantity represented by said combined signals,
   (h) means for storing all of said electrical signals,
   (i) means for vectorially adding said stored signals,
   (j) means for storing said vectorially added signals, and means for supplying said last-named stored signals to a utilization circuit.

14. The apparatus according to claim 13 wherein said utilization circuit is a video display device.

* * * * *